(12) United States Patent  
Connolly

(10) Patent No.: US 8,434,739 B1
(45) Date of Patent: May 7, 2013

(54) ADJUSTABLE DEMOLITION LEVERAGING TOOL AND METHOD

(76) Inventor: John Connolly, Phoenix, AZ (US)

( * ) Notice: Subject to any disclaimer, the term of this patent is extended or adjusted under 35 U.S.C. 154(b) by 388 days.

(21) Appl. No.: 12/800,867

(22) Filed: May 24, 2010

Related U.S. Application Data

(60) Provisional application No. 61/217,150, filed on May 26, 2009.

(51) Int. Cl.
*B66F 3/00* (2006.01)
*B66F 15/00* (2006.01)
*F16B 7/00* (2006.01)

(52) U.S. Cl.
USPC .............. 254/130; 17/166; D08/89; 403/108; 403/150; 254/131.5

(58) Field of Classification Search .............. 7/130, 131, 7/131.5, 114, 115, 116, 166, 170; 15/172, 15/236.01, 236.05, 236.06; 30/172, 304, 30/305, 329, 340, 342; 254/130, 131, 131.5; 294/51, 52, 53.5; D08/88, 89; 81/177.1, 81/177.5, 177.7, 177.8, 177.9, 489; 403/91, 403/92, 93, 94, 95, 108, 150, 151, 152, 153, 403/154, 155, 156, 157, 158, 159
See application file for complete search history.

(56) References Cited

U.S. PATENT DOCUMENTS

| 102,087 | A | * | 4/1870 | Bruso | 254/131 |
| D4,811 | S | * | 4/1871 | Christie | D8/89 |
| 752,115 | A | * | 2/1904 | Smith | 294/50.8 |
| 1,375,751 | A | | 4/1921 | Grannis | |
| 1,404,666 | A | * | 1/1922 | Stekley | 172/372 |
| 1,559,976 | A | * | 11/1925 | Ness | 254/131 |
| 2,374,530 | A | | 4/1945 | Fiebke, Sr. | |
| 2,680,003 | A | | 6/1954 | Feinstein | |
| 2,787,491 | A | * | 4/1957 | Roberts | 294/51 |
| 2,921,773 | A | | 1/1960 | Hoelzer | |
| 3,049,337 | A | * | 8/1962 | Griggs | 254/131 |
| 3,175,347 | A | * | 3/1965 | Scheidenhelm | 56/400 |
| D270,895 | S | * | 10/1983 | Holloway | D8/89 |
| 4,490,088 | A | * | 12/1984 | Castle | 414/457 |
| 4,653,728 | A | * | 3/1987 | Mochizuki et al. | 254/131 |
| 4,789,134 | A | * | 12/1988 | Tenuto et al. | 254/104 |
| D327,206 | S | * | 6/1992 | Johnson | D8/14 |
| 5,265,661 | A | * | 11/1993 | Tran | 157/1.3 |
| 5,423,114 | A | * | 6/1995 | Johnson | 29/267 |
| 5,447,289 | A | * | 9/1995 | Callahan | 254/131 |
| 5,758,480 | A | | 6/1998 | Creasy | |
| 5,768,960 | A | | 6/1998 | Archuleta | |
| 5,791,707 | A | * | 8/1998 | Szakurski | 294/54.5 |
| 5,813,295 | A | | 9/1998 | Jensen, Jr. | |
| 5,971,653 | A | * | 10/1999 | Harpell | 403/97 |
| 6,105,469 | A | * | 8/2000 | Gracy | 81/45 |
| 6,109,013 | A | * | 8/2000 | Scott | 56/400.05 |
| 6,536,535 | B1 | * | 3/2003 | Washek | 172/378 |
| 6,644,627 | B1 | | 11/2003 | Forrester | |

(Continued)

*Primary Examiner* — Brian Glessner
*Assistant Examiner* — Joseph J Sadlon
(74) *Attorney, Agent, or Firm* — Paul B. Heynssens Attorney at Law, PLC

(57) ABSTRACT

An adjustable demolition leverage tool capable of removable and adjustable connection to various rotationally and positionably adjustable tool heads being specifically shaped to achieve various demolition tasks. The tool heads are configured so the distance between the two side edges of a tool head may be extended or reduced and the angle of the leading edge of the tool head with respect to the handle of the leverage tool may also be adjusted.

4 Claims, 4 Drawing Sheets

U.S. PATENT DOCUMENTS

| | | | |
|---|---|---|---|
| 6,763,542 B2 * | 7/2004 | Huang | 7/116 |
| D498,129 S * | 11/2004 | Parker et al. | D8/89 |
| 7,025,331 B2 | 4/2006 | Whelan | |
| D532,273 S * | 11/2006 | Yoson | D8/88 |
| 7,278,626 B1 | 10/2007 | Chang | |
| 8,201,806 B2 * | 6/2012 | Liou | 254/27 |
| 8,215,617 B2 * | 7/2012 | Liou | 254/131.5 |
| 8,225,450 B2 * | 7/2012 | Petersen | 15/106 |
| 8,225,451 B2 * | 7/2012 | Weinberger et al. | 15/111 |
| 8,256,808 B2 * | 9/2012 | Spellman | 294/3 |
| 2009/0172903 A1 * | 7/2009 | Vosbikian | 15/172 |

* cited by examiner

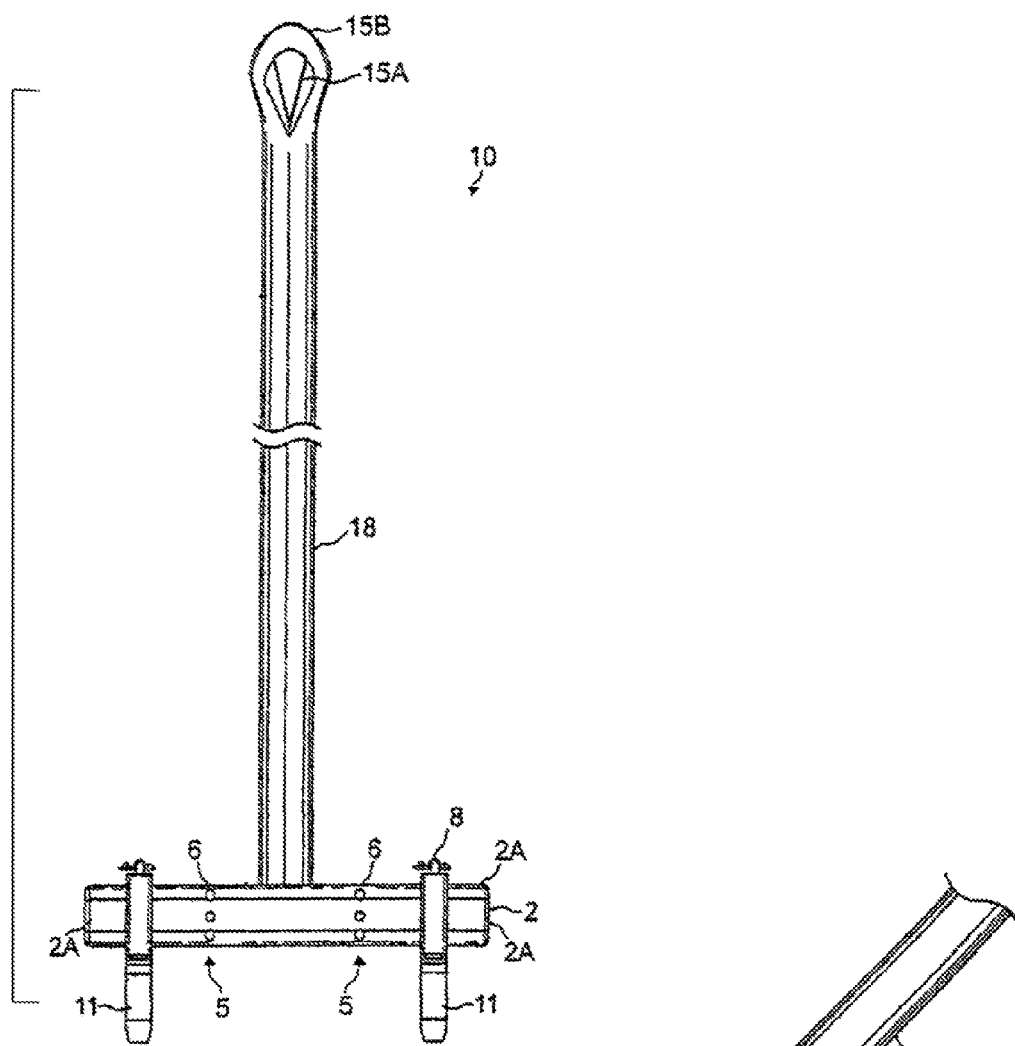
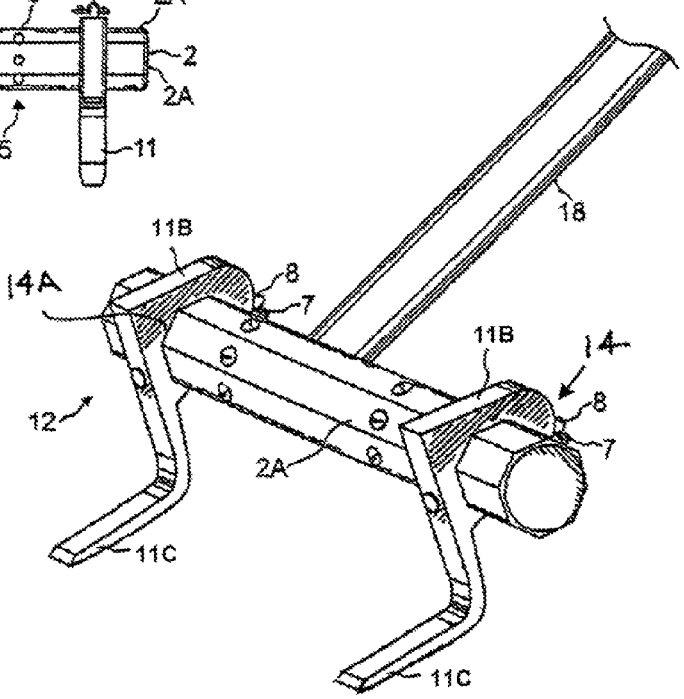

ADJUSTABLE DEMOLITION LEVERAGING TOOL AND METHOD

CROSS-REFERENCE IS MADE TO RELATED APPLICATION

This application is based on U.S. Provisional Patent Application Ser. No. 61/217,150, filed May 26, 2009, of the same title.

FIELD OF THE INVENTION

The present invention relates to a demolition tool, and more particularly to an adjustable demolition leverage tool having a plurality of interchangeable tool heads, enabling the user to select from a plurality of tool heads appropriate for the task. The tool heads are adjustable along a cross-member and are also angularly adjustable with respect to the handle of the tool.

BACKGROUND OF THE INVENTION

A necessary preliminary step prior to construction remodeling is often the complete or partial demolition of the areas to be remodeled. Construction demolition requires the use of various tools, depending on the area being demolished, the material being demolished and the extent of the desired demolition. Many of these various tools apply a prying or scraping mechanism in order to achieve their specific intended function.

One problem with many demolition projects is that multiple tools are generally required. Furthermore, the appropriate desired width and angle of these various tools may differ from job to job. The requirements of the task may require a narrower or wider tool head, or may require the tool head to have an unconventional angle with respect to the tool lever or handle. Current demolition tools do not have interchangeable tool heads to allow the tool to be used to perform multiple functions. Furthermore, current demolition tools do not allow the user to adjust the width and angle between multiple tool heads.

Therefore, a need exists for a tool and method to overcome the above problems. The tool and method need to be adaptable to avoid the undue multiplicity of the various tools used in construction demolition. There also exists a need to provide a tool capable of having multiple tool heads which are adjustable both as to spacing as well as to the angle of the tool heads relative to the handle.

BRIEF SUMMARY OF THE INVENTION

In accordance with one embodiment, the tool is a demolition leverage tool having a handle with a cross-member attached at its bottom end perpendicular to the handle. The cross-member may be attached to various removable and angularly positionable tool heads for different types of demolition, such as prying or scraping.

In use, the leveraging tool is centered on the top of a joist or other structural member so a manual force may be applied in a fulcruming action to evenly distribute forces on the board or section to be removed. The tool removes decking material, fence boards, and the like and limits breaking or splintering of boards and limits slipping of the tool avoiding harm to the user. The dynamics of the tool provide to the worker ease of adjustments and evenly distributes force whether the boards are being removed from a single or double foist, stud, rafter and the like.

The tool heads may include, but are not limited to the following:

1. A flat spade type of head for removing sheet goods such as plywood, sub floors, laminates, tiles and roofing materials. The edge of the head may be forked for removing nails under roofing materials or the edge may be a knife edge to lift sub floors, plywood, and the like.

2. A small spade for initially prying 2×joists, 2×4s, 2×6s, decking materials and the like is used.

3. A radius head for applying a force along the edge or beneath materials to be removed such as flooring, decking, plaster, wooden fence boards or other items that have been nailed to single or double joists, studs, beams, rafters and the like.

This tool is made of a durable material such as tool steel providing the user with many years of use. The tool's versatility permits the tool to be used not only in demolition projects, but also in construction work such as lifting the lower sheet of drywall while being installed, holding the boards in place while being faceted to other material as well as many other uses.

The removable and adjustable tool heads are angularly adjustable about the cross-member, thereby making the angle of the tool heads adjustable with respect to the longitudinal axis of the handle. The front or leading edge of the various tool heads may be forked, pointed, saw-toothed or have a sharpened edge or other configuration. The leading edge will typically be thin compared to the thickness of the rest of the particular tool head. The various tool heads will be sufficiently sturdy to resist bending in response to forces exerted during use.

The interchangeablee tool heads are collectively capable of evenly prying floorboards, wallboards, siding, drywall, roofing and other materials from joists, studs, concrete and other surfaces and will also be capable of removing linoleum, carpet, wallpaper, tile, ceiling texture and other materials from the surfaces to which they are affixed/adhered.

The features, functions and advantages of the present invention can be achieved independently in various embodiments or may be combined in yet other embodiments.

BRIEF DESCRIPTION OF THE DRAWINGS

The above and other advantages and objects of the present invention will become more apparent when taken in conjunction with the following description, claims and drawings in which:

FIG. 1 is a front view of one embodiment of the present invention;

FIG. 2 is a perspective view of the tool head and cross-member of the embodiment shown in FIG. 1;

DETAILED DESCRIPTION OF THE DRAWINGS

Figure 3:
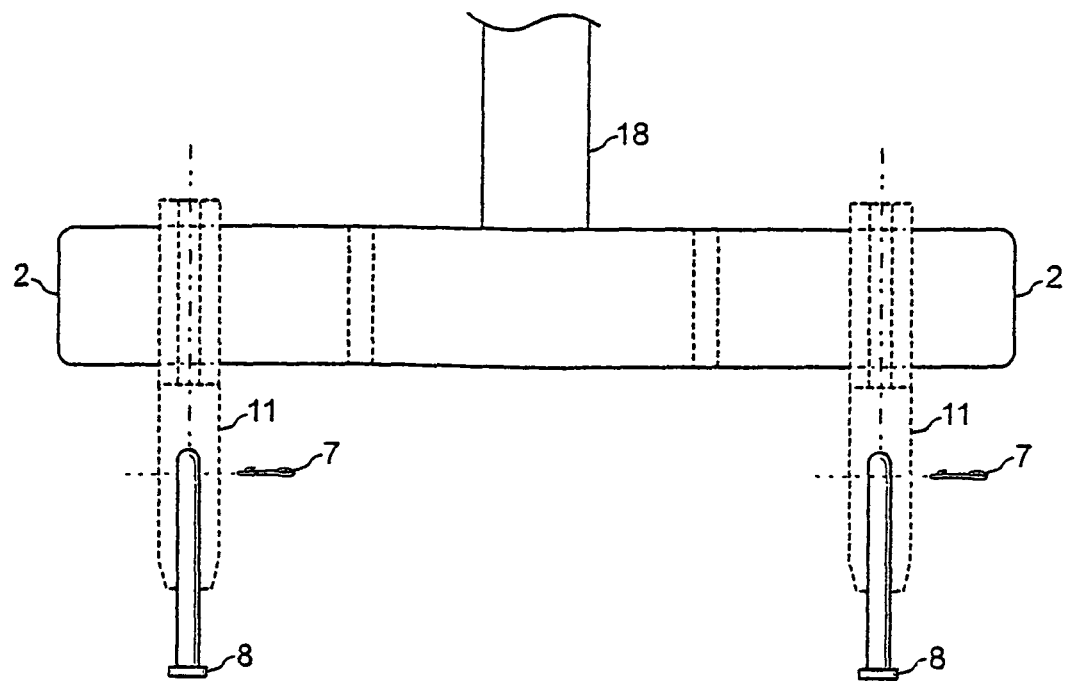
FIG. 3 is a partial cross-sectional top view of the cross-member and tool of the embodiment of FIG. 1.
Figure 4:
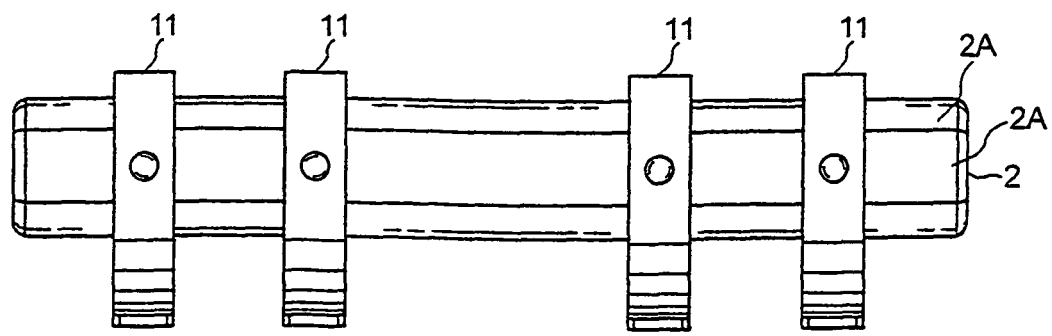
FIG. 4 is a bottom view of the cross-member with four tool heads attached and with the lock pins in their engaged positions.

Referring to the Figures, an adjustable demolition leverage tool 10 is shown. The adjustable demolition leverage tool 10 has interchangeable tool heads 11 to allow the tool 10 to perform multiple functions. Furthermore, the tool 10 allows the user to adjust the width between the tool heads 11 as well as to adjust the angle of the tool heads 11 relative to the handle 18.

As shown in the Figures, the tool 10 has a handle 18. The handle 18 is fabricated from a suitable material such as steel or iron. Other materials may be used so long as the material may be able to withstand the stresses applied to the tool 10 and not unduly bend or flex. The handle 18 may be provided in different lengths to allow one to vary the leverage applied on the tool 10.

On the upper end of the handle 18 is a V-slot 15A. The V-slot 15A is used for pulling out nails and the like. A ring eyelet 1 SS is formed around the V-slot 15A. The ring eyelet 15B helps to apply leverage when removing a nail or other item with the V-slot 15A. The ring eyelet 15B is also used to hook the tool 10 on a bracket, a nail, tool belt or the like when not in use.

Connected to an opposite, lower end of the handle 18 is cross-member 2. The cross-member 2 extends perpendicular to the handle 18 and is generally fabricated from the same material as handle 18. In accordance with one embodiment, the cross-member 2 is removably attached to the handle 18 so that handles 18 of different lengths may be attached to the cross-member 2.

The cross-member 2 has a plurality of sets of holes 5 formed therethrough at spaced-apart locations. Each set of holes 5 allow a tool head 11 to be positioned at different locations along the cross-member 2 as well as at different angles relative to the handle 18. The sets of holes 5 are formed at various positions along the cross-member 2 and perpendicularly aligned to the longitudinal axis of the cross-member 2. Each set of holes 5 has a plurality of individual holes 6 at various angles with respect to the handle 18. Each of the individual holes 6 in each set of holes 5 extend from a first facet or surface 2A of the cross-member 2 to an opposite, second surface of the cross-member 2. Each of the individual holes 6 are used to receive a lock pin member 8 for securing the tool head 11 to the cross-member 2 at a selected location.

The tool 10 has a plurality of different tool heads 11 which may be attached to the cross-member 2. Each of the various tool heads 11 has a coupling member 12. The coupling member 12 allows the tool head 11 to be removably attached to the cross-member 2. In accordance with one embodiment, the coupling member 12 has as bore 14 formed through the coupling member 12 of the tool head 11 capable of allowing the cross-member 2 to pass through the large bore 14 of the coupling member 12.

In accordance with one embodiment of the present invention, the bore 14 and cross-member 2 are polygonal in cross-section. The cross-member has a plurality of faces or surfaces 2A. The bore 14 in the tool head 11 has a similar polygonal shape having an equal number of side surfaces 14A. The side surfaces 2A and 14A will establish the adjustable angular positions of the tool head 11. As shown, the octagonal shapes of the cross-member 2 and the bore 14 cooperate to provide eight adjustable positions for the tool head 11. Various other polygonal or other configurations to provide adjustability may also be used.

Figure 5A:
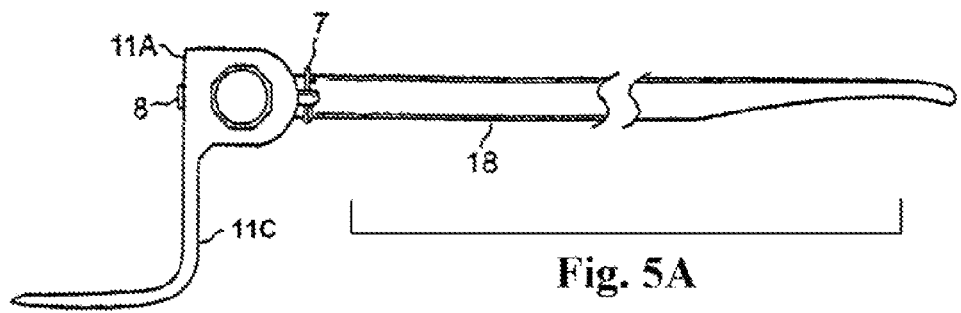
FIG. 5A is a side view of the embodiment shown in FIG. 1.
Figure 5B:
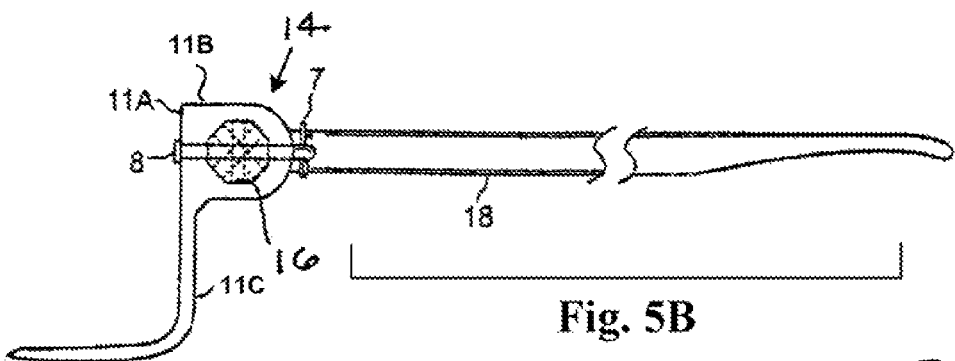
FIGS. 5B, 5C and 5D are side views of the embodiment shown in FIG. 1 showing a tool head attached at various angles with respect to the handle and with the lock pins in their engaged position.
Figure 5C:
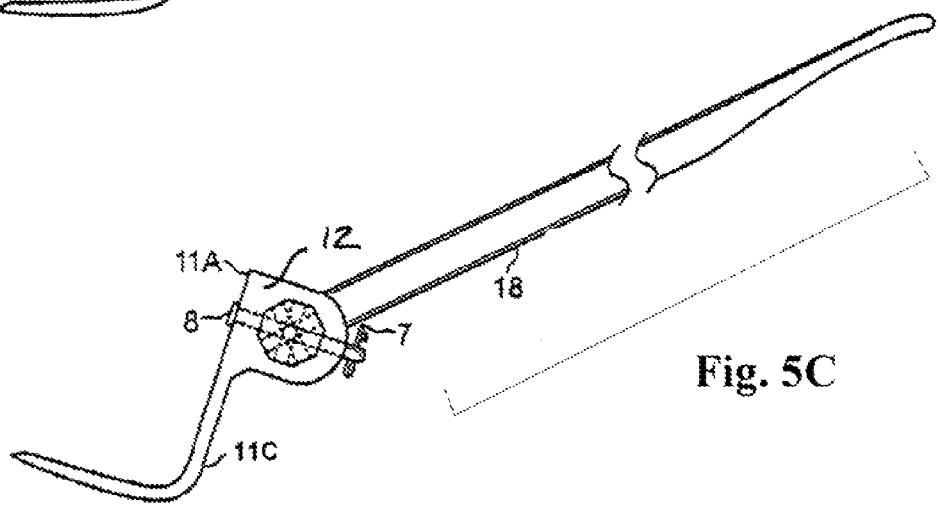
Figure 5D:
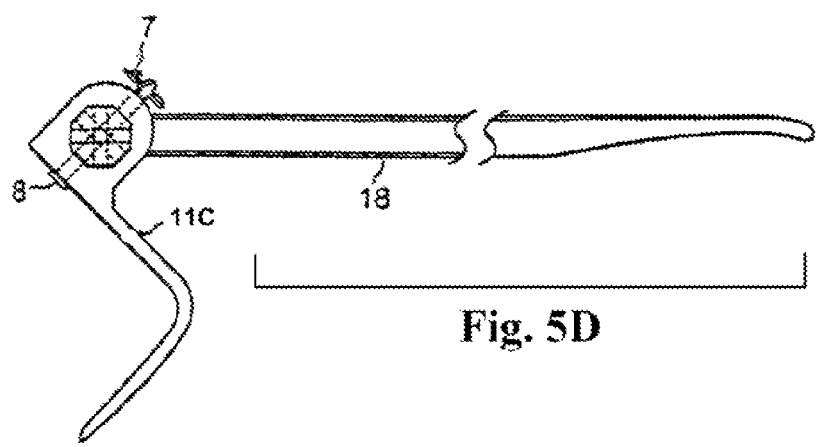

As shown more clearly in FIGS. 5A through 5D, the cross-member 2 has several channels 16 extending therethrough. The channels 16 extend from a front surface 11A to an opposite, rear surface of the tool head. As shown in FIGS. 5B through 5D, multiple channels 16 are shown. For example, one channel 16 is approximately parallel with a too surface 11B of the tool head 11 while another channel 16 is approximately perpendicular to the front surface 11A. The channels 16 are provided to receive the lock pin 8 to dispose a tool portion 11C at a selected angle. When a tool head 11 is placed at a proper location spaced from the handle 18 and at the proper angle, the user will place the lock pin 8 through the tool head 11 and through the channel 16. A holding pin 7 is then placed in the lock pin 8 to secure the tool head in a selected position on the cross-member 2.

Figure 6:
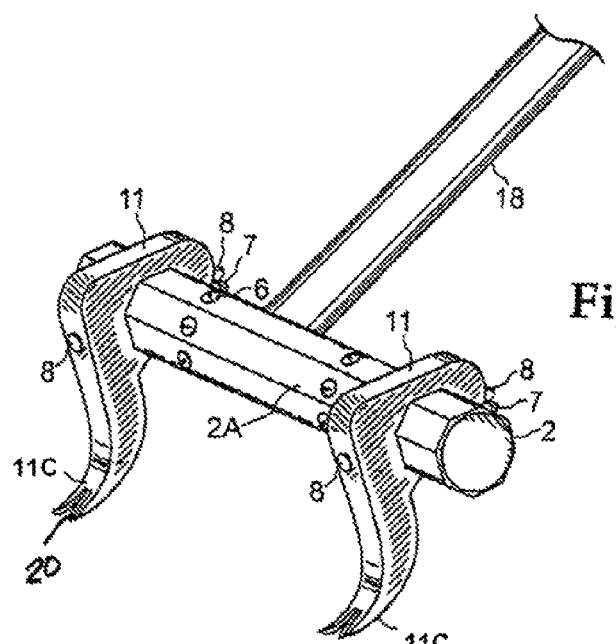
FIG. 6 is a perspective view of the embodiment shown in FIG. 1 with different tool heads attached to the cross-member.

As stated above, the tool 10 will have multiple interchangeable tool heads 11. Thus, the tool 10 may have different tool heads 11 that will, collectively, be capable of evenly prying floorboards, wallboards, siding, drywall, roofing and other materials from joists, studs, concrete and other surfaces and would also be capable of removing linoleum, carpet, wallpaper, tile, ceiling texture and other materials from the surfaces to which they are adhered. Some examples of different tool heads 11 are shown in the Figures. Referring to FIGS. 1, 2 and 5 through 5C, the tool 10 is shown having tool heads 11 designed with floorboard removal heads attached. In FIG. 6, the tool 10 is shown with tool heads 11 wherein the heads are pry bar tool heads with the ends of the arms being slotted at 20.

Figure 7:
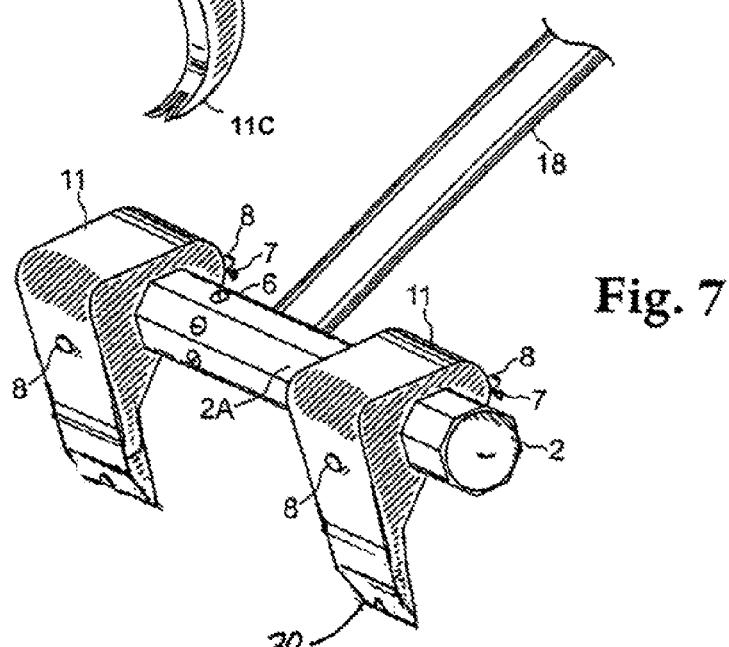
FIG. 7 is a perspective view of the embodiment shown in FIG. 1 with other tool heads attached to the cross-member.

Referring to FIG. 7, the tool 10 is shown with tool heads 11 for scraping. The tool heads 11 are adjustable so the sharpened ends 30 can be positioned as required.

Figure 8:
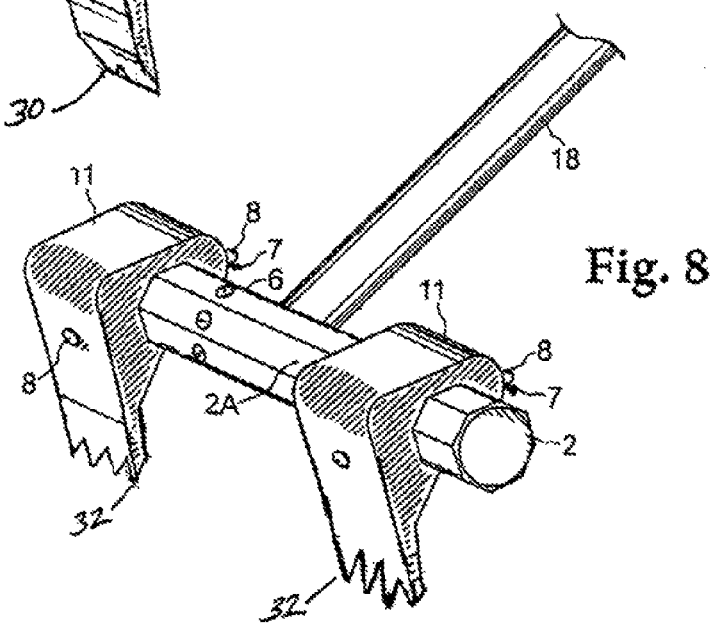
FIG. 8 is a perspective view of the embodiment shown in FIG. 1 with different tool heads attached.

Referring to FIG. 8, another embodiment of the tool head 11 is shown. The tool head 11 is shown with a plurality of teeth 32 for prying and scraping.

While embodiments of the disclosure have been described in terms of various specific embodiments, those skilled in the art will recognize that the embodiments of the disclosure can be practiced with modifications within the spirit and scope of the claims.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. An adjustable construction and demolition tool comprising:
   an elongate handle having an upper and a lower end:
   (b) a cross member having opposite ends extending transversely at the lower end of the handle, said cross member having a polygonal cross-section with a plurality of faces, said cross member defining a plurality of spaced-apart sets of through bores extending from each of said faces to an opposite face;
   (c) a pair of removable tool heads each tool head having a tool portion and a coupling portion, the coupling portion defining a polygonal bore conforming to the cross-section of the cross member and the coupling portion further defining a second bore, said tool heads being angularly adjustable and slidable along said cross member to place said second bores in registry with selected ones of said through bores; and
   (d) a locking pin insertable in said second bores to secure said tool heads at a selected position on said cross member.

2. The adjustable construction and demolition tool of claim 1 wherein said tool portion is selected from the group consisting of flat spades, pointed, sawtoothed, sharp edged and forked tools.

3. The adjustable construction and demolition tool of claim 1 wherein the upper end of the handle has an eyelet.

4. The adjustable construction and demolition tool of claim 1 wherein the cross member and tool heads are tool steel.

* * * * *